G. V. LEHEW.
STREET SWEEPING MACHINE.
APPLICATION FILED SEPT. 15, 1916.

1,265,685.

Patented May 7, 1918.
5 SHEETS—SHEET 1.

Witnesses
J. H. Crawford
J. J. McCarthy

Inventor
G. V. Lehew,

By Victor J. Evans
Attorney

G. V. LEHEW.
STREET SWEEPING MACHINE.
APPLICATION FILED SEPT. 15, 1916.

1,265,685.

Patented May 7, 1918.
5 SHEETS—SHEET 5.

Fig. 5.

Fig. 6.

Inventor
G. V. Lehew,

By Victor J. Evans
Attorney

Witnesses
J. H. Crawford
J. J. McPetty

UNITED STATES PATENT OFFICE.

GEORGE V. LEHEW, OF AKRON, OHIO.

STREET-SWEEPING MACHINE.

1,265,685.   Specification of Letters Patent.   Patented May 7, 1918.

Application filed September 15, 1916. Serial No. 120,392.

*To all whom it may concern:*

Be it known that I, GEORGE V. LEHEW, a citizen of the United States, residing at Akron, in the county of Summit and State of Ohio, have invented new and useful Improvements in Street-Sweeping Machines, of which the following is a specification.

This invention relates to improvements in street sweeping machines and has particular application to a motor driven street sweeping machine.

One object of the invention is to provide in a motor driven machine carrying main and auxiliary brushes, certain novel means for controlling the main brush and throwing it into operative position, said means permitting of placing this brush in operative connection with the driving mechanism prior to contact with the ground, so that the shock incident to the starting operation will be reduced or eliminated.

A further object is to provide in a machine of the type above specified certain means for conveying the refuse material to a suitable container, this means being operated pneumatically.

With the above and other objects in view, the invention consists in the construction, combination and arrangement of parts hereinafter set forth in and falling within the scope of the claims.

In the accompanying drawings:—

Figure 1:
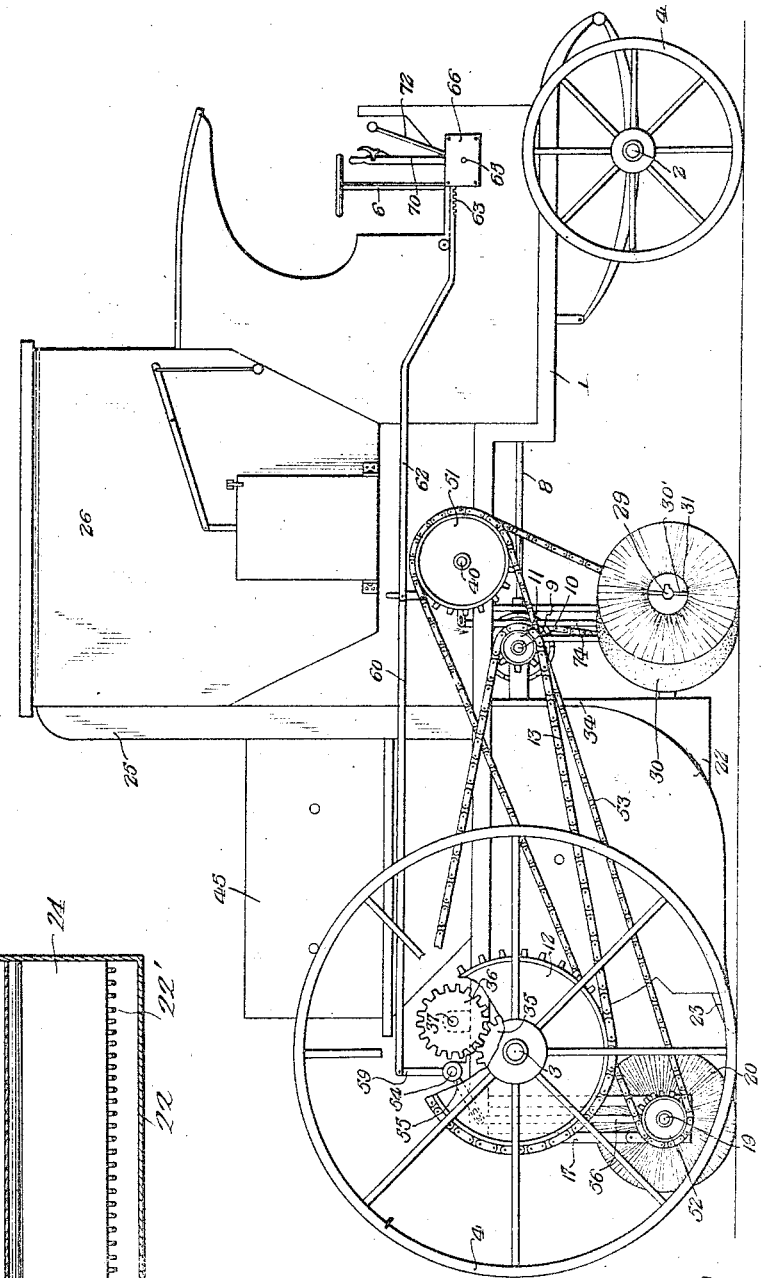
Figure 2:
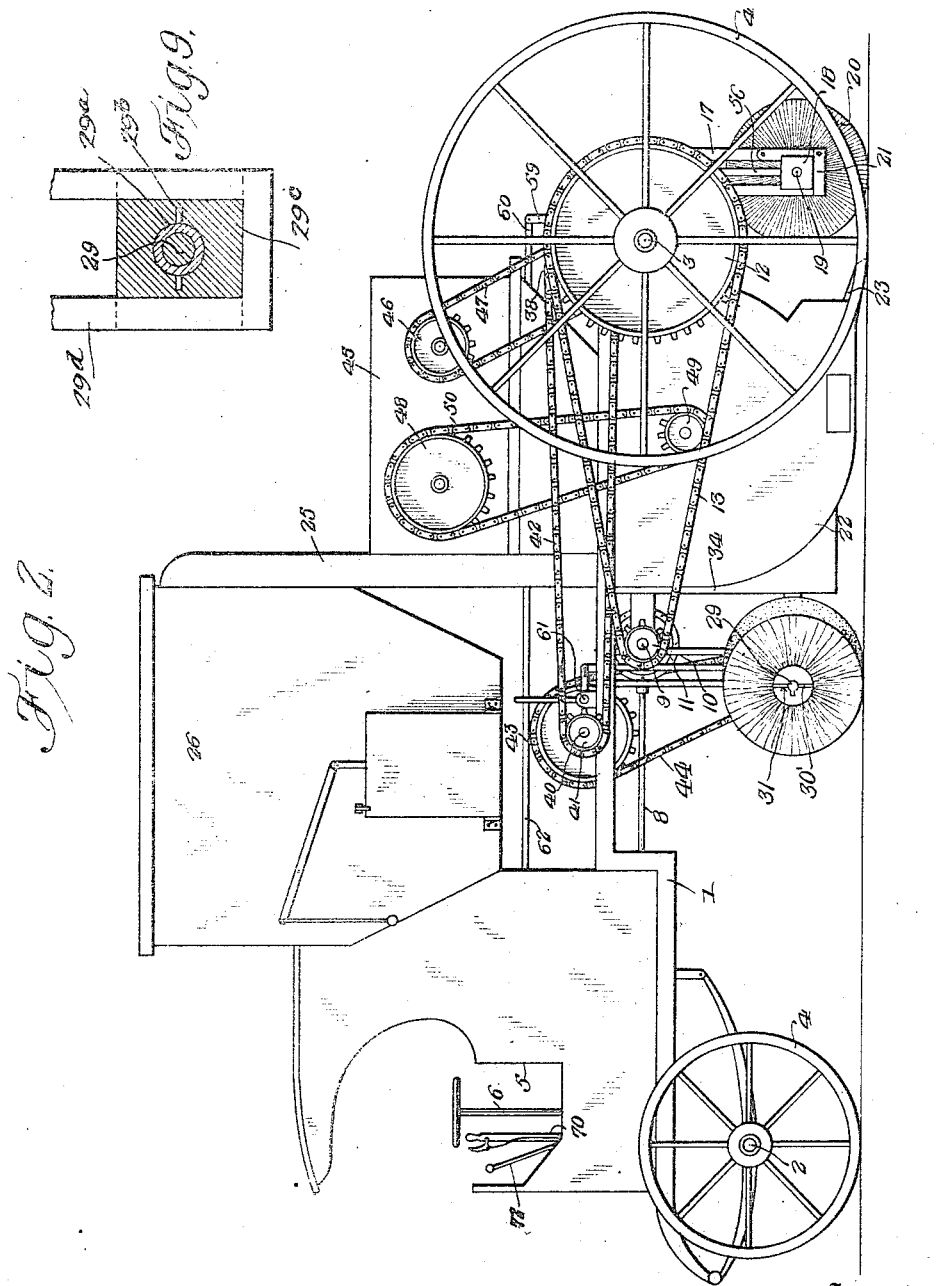
Figure 3:
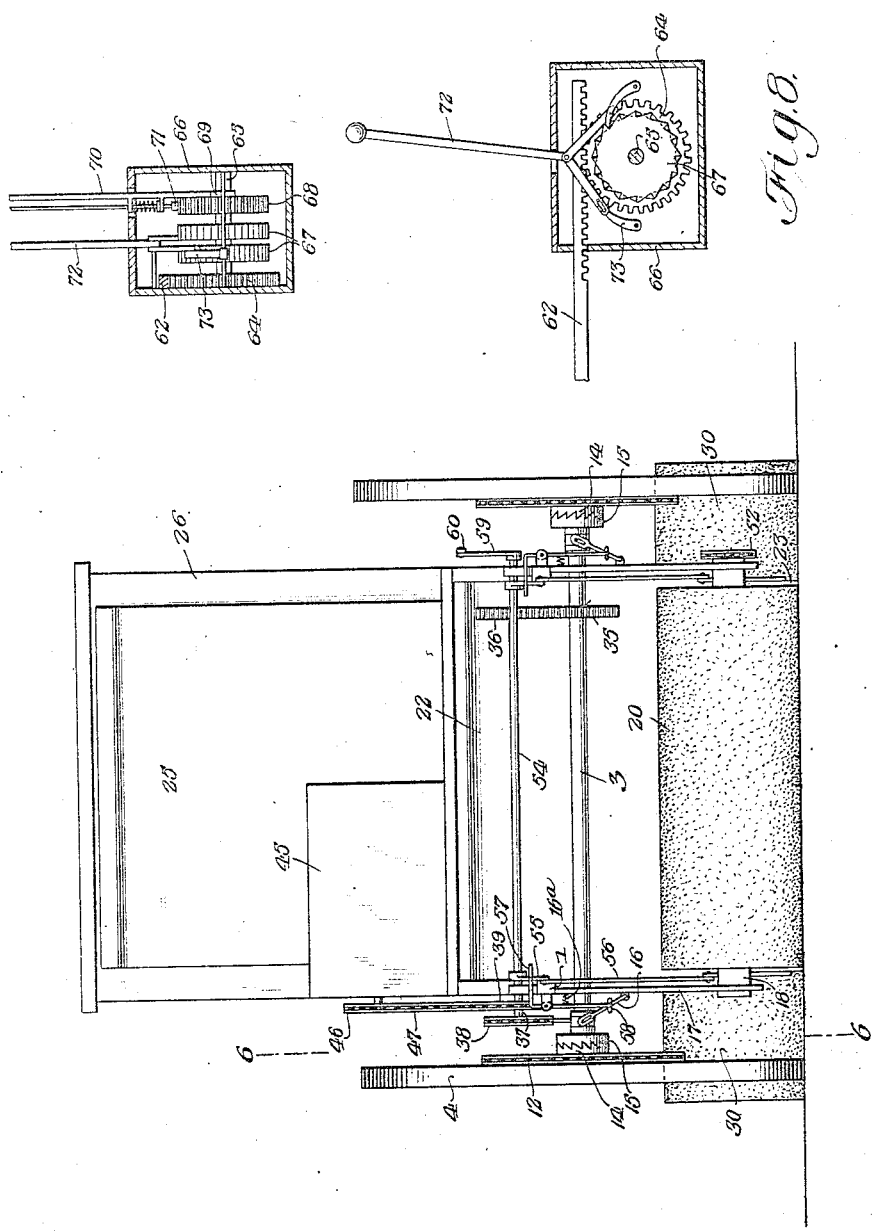
Figure 4:
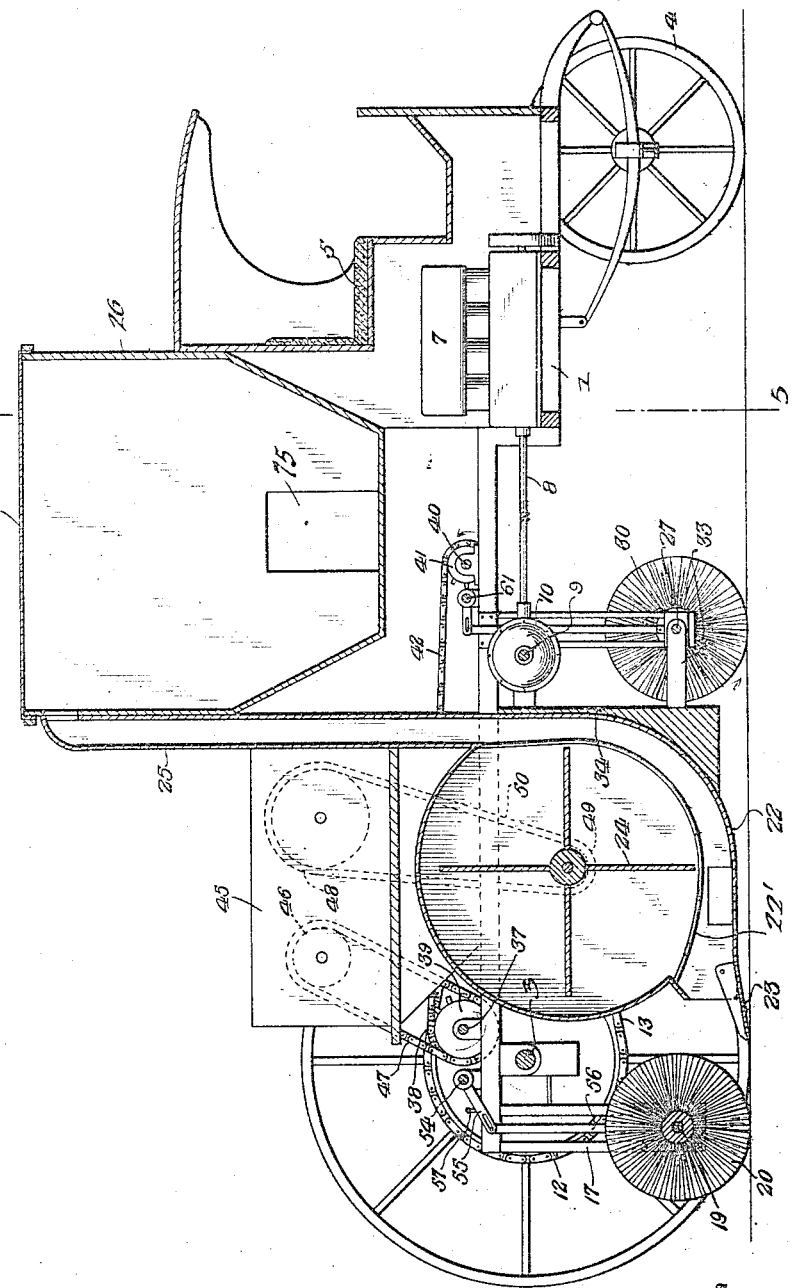

Figure 1 is a view in side elevation of a street sweeper constructed in accordance with the present invention, certain of the parts being broken away, Fig. 2 is a view of the opposite side of the machine, Fig. 3 is a rear elevation of the machine, Fig. 4 is a longitudinal sectional view through the machine, Fig. 5 is a cross sectional view through the forward portion of the machine, the section being taken on the line 5—5 of Fig. 4, Fig. 6 is a view approximately on the line 6—6 of Fig. 2, Fig. 7 is an enlarged fragmentary view showing the clutch mechanism, Fig. 8 is a similar view showing the controlling mechanism for the brushes and clutches, Fig. 9 is a fragmentary view showing a detail of the invention.

Fig. 10 is a section through a receptacle or casing inclosing a pan and showing a guard for the pan.

Referring now to the drawings in detail 1 designates the main frame of the machine equipped, at its opposite ends, with front and rear axles 2 and 3 respectively. Loosely arranged upon the outer ends of the axles 2 and 3 are ground wheels 4, while mounted upon the forward end of the main frame is a driver's seat 5 and arranged in juxtaposition to the seat is a steering column 6 suitably connected with the ground wheels on the front axle 2 so that the machine may be steered. Arranged beneath the driver's seat is an internal combustion engine 7 connected by means of a drive shaft 8 with a cross shaft 9 arranged across the frame 1 behind the driver's seat and located at the point of connection with the drive shaft with the cross shaft is a differential gear set 10 whereby motion may be transmitted from the drive shaft to the cross shaft, in the usual well known manner, the cross shaft being divided into two axially alining sections to permit the differential gear to function. On the outer ends of the cross shaft 9 are sprocket pinions 11 while connected to the rear wheels concentrically of the rear axle are sprocket wheels 12 and trained over the corresponding pinions and wheels 11 and 12 are endless chains 13 whereby motion may be transmitted from the cross shaft to the rear wheels of the vehicle to propel the latter. The wheels on the rear axle 3 are capable of rotation around the axle and are adapted to be connected to the axle to rotate the latter. Secured to the inner sides of the hubs of the wheels on the rear axle are clutch members 14 while splined upon the rear axle and adapted to engage the clutch members 14 respectively are clutch members 15. The clutch members 15 are under the control of bail members 16 and when the rods are operated in one direction the clutch members 15 engage the clutch members 14 to connect the rear wheels to the axle, while the rods are operated in the reverse direction when the members 15 are disengaged from the companion members 14 so that the rear wheels may revolve freely around the axle.

Secured to the side bars of the main frame 1 at the rear ends thereof and depending therefrom are vertical guides 17 and slidably mounted in the guides 17 are blocks 18 in which are journaled the ends of a horizontal shaft 19 carrying a main brush 20. The lower ends of the guides 17 are suitably braced as at 21. Depending from the frame 1 immediately in advance of the brush 20 is a receptacle 22 having the end adjacent to the brush 20 open and pivoted to the lower wall of the receptacle 22 is a pan 23 adapted to engage the ground, in the operation of the machine, and forming a guide to direct the refuse swept up by the brush 20 into the receptacle 22. Rotatably mounted in the receptacle 22 is a fan 24 while connected to the forward end of the receptacle and projecting upwardly therefrom is a conduit 25 having the upper end opening into a refuse container 26 mounted upon the frame 1. The fan 24 is designed to blow the refuse through the conduit 25 into the container 26 in the operation of the machine. Arranged below the cross shaft 9 is a horizontal shaft 27 and connected to the outer ends of the shaft 27 through the medium of universal joints 28 are auxiliary brush-carrying shafts 29 arranged at an angle to the shaft 27 and mounted upon the shaft 29 are auxiliary brushes 30. These auxiliary brushes 30 are capable of longitudinal movement along the shafts 29 and the outer ends of the hubs of the brushes 30 are formed with transverse grooves 31 that aline holes 30' in the outer ends of the shafts respectively and through these alining grooves and bores are passed pins 31 that serve to limit the outward movement of the brushes, while surrounding the shafts 29 adjacent the inner ends of the brushes are springs 32 to hold the brushes normally at their limit of outward movement and permitting the brushes to move inwardly along the shafts in the event of the outer ends of the brushes rubbing against the curb stone or other obstacle. The shaft 27 is rotatably mounted in bearings 33 that are mounted upon a base board 34 carried by the main frame 1 and suitably suspended therefrom. Each auxiliary brush carrying shaft 29 is mounted in a ring 29$^a$ provided with outwardly projecting horizontally disposed trunnions 29$^b$ pivoted within a block 29$^c$ slidably mounted within vertical guides 29$^d$ depending from the frame of the machine, as clearly shown in Figs. 5 and 9 of the drawings.

Fixed upon the rear axle 3 is a spur pinion 35 meshing with a similar pinion 36 fixed upon a horizontal shaft 37 journaled in the alining bearings carried by the frame 1 at the rear end of the latter. Keyed upon the shaft 37 adjacent one end thereof are sprockets wheels 38 and 39. Journaled in bearings carried by the main frame 1 above the cross shaft 10 is a transverse shaft 40 and fixed upon one end of the shaft 40 is a sprocket wheel 41 over which and the sprocket wheel 38 is trained an endless chain 42 whereby motion may be transmitted from the shaft 37 to the shaft 40. Fixed upon the shafts 40 and 27 are sprocket wheels 43 and over these sprocket wheels is trained a chain 44 whereby motion may be transmitted to the shafts 40 and 27 to revolve the auxiliary brushes 30. Mounted upon the main frame 1 behind the refuse container 26 is a speed increasing gear set inclosed in casing 45 and fixed upon the driving shaft of the gear set is a sprocket wheel 46 and over the sprocket wheel 46 and the sprocket wheel 39 is trained a chain 47 whereby motion may be transmitted from the shaft 37 to the gear set. The driven shaft of the gear set 45 is equipped with a sprocket wheel 48 and over the sprocket wheel 48 and a sprocket wheel 49 on the shaft of the fan 23 is trained a chain 50 whereby the fan may be revolved at relatively high speed as compared with the rotation of the shaft 37. On the end of the shaft 40 remote from the sprocket wheel 41 is a sprocket wheel 51 while fixed upon the corresponding end of the shaft 19 of the main brush 20 is a sprocket wheel 52 and over these sprocket wheels 51 and 52 is trained a chain 53 whereby motion may be conveyed from the shaft 40 to the main brush shaft thereby revolving the main brush. By means of this construction it will be seen that when the rear axle is driven by the rear wheels motion is transmitted from said axle to the main brush, the auxiliary brushes and the fan thereby enabling the refuse to be thrown into the receptacle 22 and then delivered to the container 26.

In order to raise and lower the main brush 20 and operate the clutches controlling the connection between the rear axle and the rear wheels, I employ the following mechanism:

Extending across the rear end of the main frame and journaled in horizontally alining bearings is a rock shaft 54 equipped with outwardly projecting arms 55 connected through the medium of links 56 with the blocks 18 so that in one direction the blocks will be drawn upwardly in the guides to elevate the brush, while in the reverse movement of the guide shaft the blocks will be moved downwardly to lower the blocks. A pivoted arm 57 having a laterally extending portion engaged by arm 55 operates each bail member 16 through the medium of a lost motion eye connection 58. Each bail member 16 is hingedly mounted at 16' and controls one clutch member, being under the influence of a spring 16$^a$ acting on arm 57 which latter is pivoted at 57'. The eye connection 58 permits a given amount of lost motion between arm 57 and bail 16. By means of this lost motion connection the clutch members are engaged with each other to drive the brushes in the initial movement of the rock shaft to lower the main brush, thereby enabling the brushes and the fan to reach a suitable speed previous to the brushes engaging the ground whereby excessive strain on the engine is prevented. Projecting upwardly from one end of the rock shaft is an arm 59 connected by the medium of the rod 60 with a rock shaft 61 extending across the main frame adjacent to the shaft 40. This rock shaft 61 is equipped with an arm that is connected with one end of a rod 62 projecting toward the front end of the machine and having the forward extremity formed with rack teeth 63. The rack teeth 63 mesh with a pinion 64 fixed upon a horizontal shaft 65 and journaled in suitable bearings carried by a casing 66 fastened to the side of the main frame at the driver's seat. Also fixed upon the shaft 65 and arranged side by side are ratchet wheels 67 having oppositely disposed teeth, and a spur pinion 68. Fulcrumed upon the shaft 65 is a yoked end 69 of a hand lever 70 equipped with a manually controlled dog 71 that normally engages the pinion 68. Also pivoted upon the shaft 65 is a lever 72 equipped with oppositely disposed dogs 73 engageable with the ratchet wheels 67 respectively. By swinging the lever 70 backward and forward and engaging the dog 71 with the pinion 68 in one direction of movement of the lever and disengaging the dog from such pinion in the opposite direction of movement of the lever, the shaft 65 may be rotated to operate the rod 62, the rock shaft 61 and the rod 60 to move the main brush 20 in one direction, or the other according to the manner in which the dog 71 is engaged with the pinion 68, and in order to prevent retrograde movement of the shaft 65 one of the dogs 73 connected to the lever 72 is engaged with the corresponding ratchet wheel 67 so as to prevent backward movement of the shaft during idle motion of the lever 70.

The rock shaft 61 is connected through a suitable link mechanism 74 with the blocks 29ᵃ so that the latter may be drawn upwardly to move the auxiliary brushes to inactive position upon the raising of the main brush and lower them upon the lowering of the main brush.

22' designates a suitable form of guard arranged within the receptacle 22 adjacent to the inlet and outlet openings thereof and this guard partially surrounds the fan so as to protect the latter against heavy particles of dirt or other refuse, thereby preventing mutilation of the blades of the fan. The top 26' of the refuse container 26 is preferably formed of a suitable fabric that acts to permit the air to be blown out of the receptacle and retain the dust.

The container 26 is provided with an outer opening adjacent to its lower end and this outer opening is controlled by a gate 75 which may be opened when it is desired to discharge the contents of the container 26. While I have herein shown and described one preferred form of my invention by way of illustration, I wish it to be understood that I do not limit or confine myself to the precise details of construction herein described and delineated as modification and variation may be made within the scope of the claims and without departing from the spirit of the invention.

I claim:—

1. In a device of the class described, a brush shaft, a brush carried thereby, means for driving said shaft, means for changing the elevation thereof and means for starting the rotation of the brush shaft before the brush is in contact with the surface of the roadway, said means last named including a rock shaft, an arm carried thereby, a spring held and pivotally mounted arm engaged by the arm first named, a clutch member, and means for operating the latter from the spring held arm and providing a limited degree of lost motion, a movable bearing for the brush shaft, and a rod connected therewith, and with the arm on the rock shaft.

2. In a device of the class described, a frame work, a motor mounted therein, a shaft driven by said motor, a brush shaft, movable bearings for mounting the brush shaft, wheels for supporting said frame, means for driving said wheels from the shaft first named, mechanism for driving and controlling the brush shaft including a clutch, a rock shaft, and means controlled thereby for throwing the clutch members into engagement and thereafter throwing the brush into contact with the surface of the roadway.

In testimony whereof I affix my signature.

GEORGE V. LEHEW.